US008708274B2

(12) United States Patent
Lord

(10) Patent No.: US 8,708,274 B2
(45) Date of Patent: Apr. 29, 2014

(54) TRANSVERSE MOUNTED GAS TURBINE ENGINE

(75) Inventor: Wesley K. Lord, South Glastonbury, CT (US)

(73) Assignee: United Technologies Corporation, Hartford, CT (US)

(*) Notice: Subject to any disclaimer, the term of this patent is extended or adjusted under 35 U.S.C. 154(b) by 249 days.

(21) Appl. No.: 13/228,942

(22) Filed: Sep. 9, 2011

(65) Prior Publication Data

US 2013/0062463 A1 Mar. 14, 2013

(51) Int. Cl.
*B64D 27/00* (2006.01)

(52) U.S. Cl.
USPC .......................................................... 244/55

(58) Field of Classification Search
USPC .......................................................... 244/55
See application file for complete search history.

(56) References Cited

U.S. PATENT DOCUMENTS

| | | | |
|---|---|---|---|
| 2,452,281 A * | 10/1948 | Zimmerman | 244/60 |
| 3,033,492 A | 5/1962 | Rowe | |
| 3,318,095 A | 5/1967 | Snell | |
| 3,659,422 A | 5/1972 | Hope | |
| 4,254,619 A * | 3/1981 | Giffin et al. | 60/226.1 |
| 4,469,294 A | 9/1984 | Clifton | |
| 4,605,185 A * | 8/1986 | Reyes | 244/60 |
| 4,676,459 A * | 6/1987 | Seefluth | 244/65 |
| 4,679,394 A | 7/1987 | Taylor | |
| 4,871,130 A * | 10/1989 | Schulze | 244/55 |
| 4,976,102 A * | 12/1990 | Taylor | 60/226.1 |
| 5,209,428 A | 5/1993 | Bevilaqua et al. | |
| 5,443,229 A * | 8/1995 | O'Brien et al. | 244/54 |
| 6,260,800 B1 | 7/2001 | Snell | |
| 6,619,030 B1 | 9/2003 | Seda et al. | |
| 6,845,606 B2 | 1/2005 | Franchet et al. | |
| 7,540,450 B2 * | 6/2009 | Brand et al. | 244/54 |
| 7,568,657 B2 * | 8/2009 | Milde, Jr. | 244/55 |
| 7,770,377 B2 | 8/2010 | Rolt | |
| 7,937,927 B2 | 5/2011 | Suciu et al. | |
| 2006/0011780 A1 * | 1/2006 | Brand et al. | 244/60 |
| 2008/0095628 A1 | 4/2008 | Suciu et al. | |
| 2008/0098719 A1 * | 5/2008 | Addis | 60/226.1 |
| 2009/0145102 A1 | 6/2009 | Roberge et al. | |
| 2009/0151317 A1 | 6/2009 | Norris et al. | |
| 2011/0056208 A1 | 3/2011 | Norris et al. | |

* cited by examiner

*Primary Examiner* — Tien Dinh
*Assistant Examiner* — Justin Benedik
(74) *Attorney, Agent, or Firm* — Kinney & Lange, P.A.

(57) ABSTRACT

A propulsion engine comprises a compressor, a combustor and a turbine arranged in flow series about a turbine axis. A shaft is coupled to the turbine along the turbine axis, and first and second propulsions fans are rotationally coupled to the turbine at opposite ends of the shaft. The first and second propulsion fans rotate substantially parallel to one another, and transversely with respect to the turbine axis.

18 Claims, 4 Drawing Sheets

TRANSVERSE MOUNTED GAS TURBINE ENGINE

BACKGROUND

This invention relates generally to gas turbine engines, and specifically to aviation applications. In particular, the invention concerns a gas turbine engine for an aircraft.

Gas turbine engines (or combustion turbines) are built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

Gas turbine engines provide efficient, reliable power for a wide range of applications, including aviation and industrial power generation. Small-scale engines including auxiliary power units typically utilize a one-spool design, with co-rotating compressor and turbine sections. Larger-scale jet engines and industrial gas turbines (IGTs) are generally arranged into a number of coaxially nested spools, which operate at different pressures and temperatures, and rotate at different speeds.

The individual compressor and turbine sections in each spool are subdivided into a number of stages, which are formed of alternating rows of rotor blade and stator vane airfoils. The airfoils are shaped to turn, accelerate and compress the working fluid flow, and to generate lift for conversion to rotational energy in the turbine.

Aviation applications include turbojet, turbofan, turboprop and turboshaft engines. In turbojet engines, thrust is generated primarily from the exhaust. Modern fixed-wing aircraft generally employ turbofan and turboprop engines, in which the low pressure spool is coupled to a propulsion fan or propeller. Turboshaft engines are typically used on rotary-wing aircraft, including helicopters.

Turbofans are commonly divided into high and low bypass configurations. High bypass turbofans generate thrust primarily from the fan, which drives airflow through a bypass duct oriented around the engine core. This design is common on commercial aircraft, where noise and fuel efficiency are primary concerns. Low bypass turbofans generate proportionally more thrust from the exhaust flow, providing greater specific thrust for use on supersonic fighters and other high-performance aircraft.

As commercial engines trend toward higher bypass ratios, fuel efficiency is increased and noise is reduced. Specific thrust is also lower, however, and the fan inlet diameter gets larger, increasing engine size and weight. Very high and ultra high bypass ratio engines thus present design challenges, particularly for aft-mounted configurations where there is less available area than on the wing.

SUMMARY

This invention concerns a propulsion engine, and an aircraft utilizing the engine. The engine includes a compressor, a combustor and a power turbine arranged in flow series about a turbine axis, a power shaft coupled to the power turbine, and two propulsion fans coupled to the power shaft.

The power shaft is oriented along the turbine axis, and the propulsion fans are rotationally coupled to the power turbine at opposite ends of the power shaft. The propulsion fans rotate substantially parallel to one another, and transversely with respect to the turbine axis.

DETAILED DESCRIPTION

Figure 1:
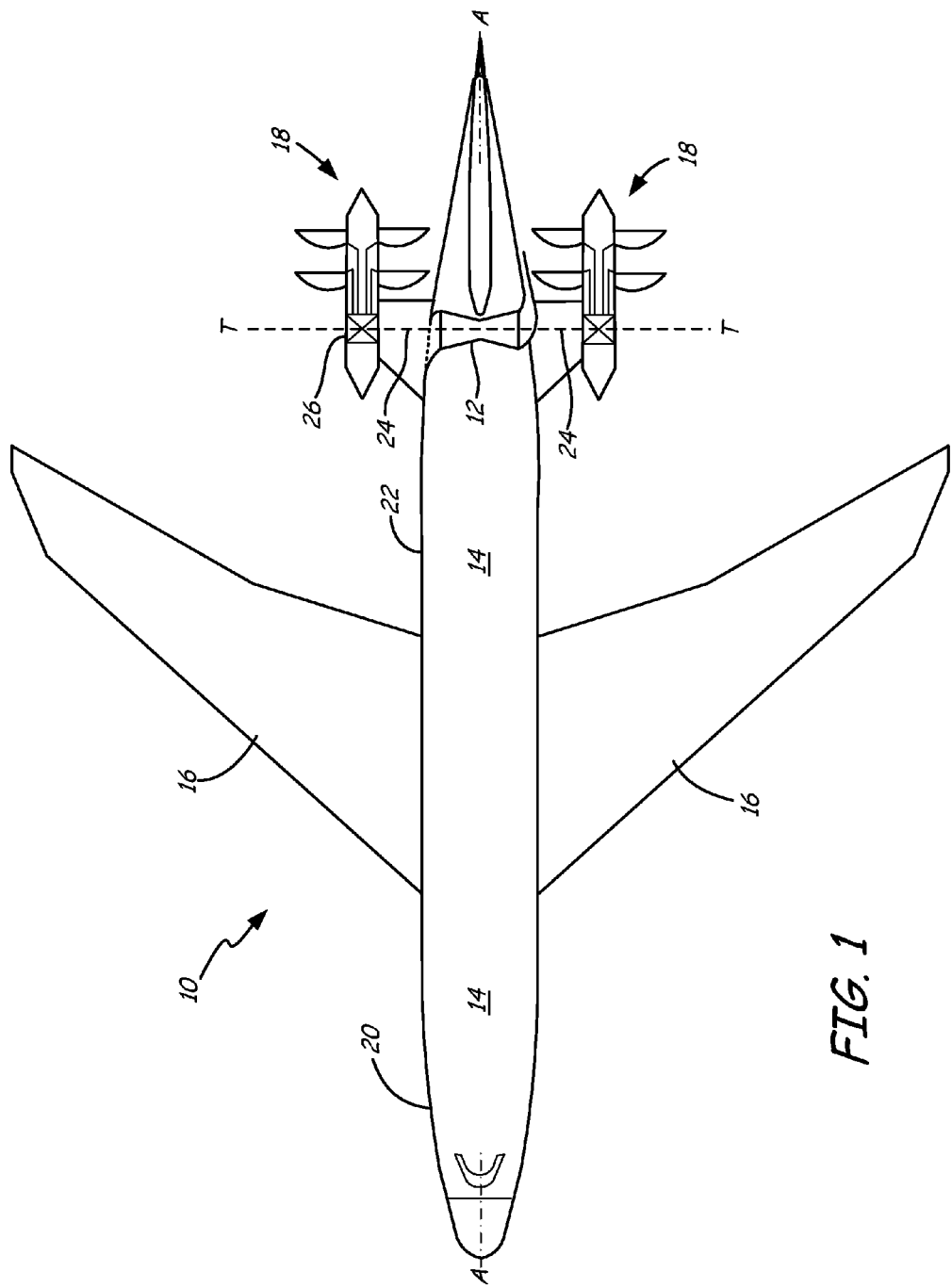
FIG. 1 is a schematic diagram of an aircraft with a transverse mounted power core and twin propulsion fan assemblies.

FIG. 1 is a schematic diagram of aircraft 10 with transverse mounted gas turbine engine 12. Aircraft 10 includes gas turbine engine 12, fuselage 14 and wings 16. Gas turbine engine 12 is transversely mounted in fuselage 14, and rotationally coupled to two propulsion fans 18.

In the particular configuration of FIG. 1, aircraft 10 is of fixed-wing design. Fuselage 14 extends from nose section 20 to tail section 22 along longitudinal axis A, with wings 16 fixed to fuselage 14 between nose 20 and tail 22. Alternatively, portions of fuselage 4 are composed of struts, for example in tail section 22.

Gas turbine engine 12 provides a power core including a gas generator and power turbine rotationally mounted about turbine axis T in tail section 22 of fuselage 14. Turbine axis T is oriented in a transverse or substantially perpendicular direction with respect to longitudinal axis A of fuselage 14.

Propulsion fans (or fan assemblies) 18 are rotationally coupled to gas turbine engine 12 via shaft 24 and right-angle gearboxes 26. Shaft 24 is oriented along turbine axis T, and rotates about turbine axis T with gas turbine engine 12. Propulsion fans 18 rotate in a transverse or perpendicular orientation with respect to turbine axis T, longitudinally or substantially parallel with respect one another, and longitudinally or substantially parallel with respect to axis A of fuselage 14.

Figure 2:
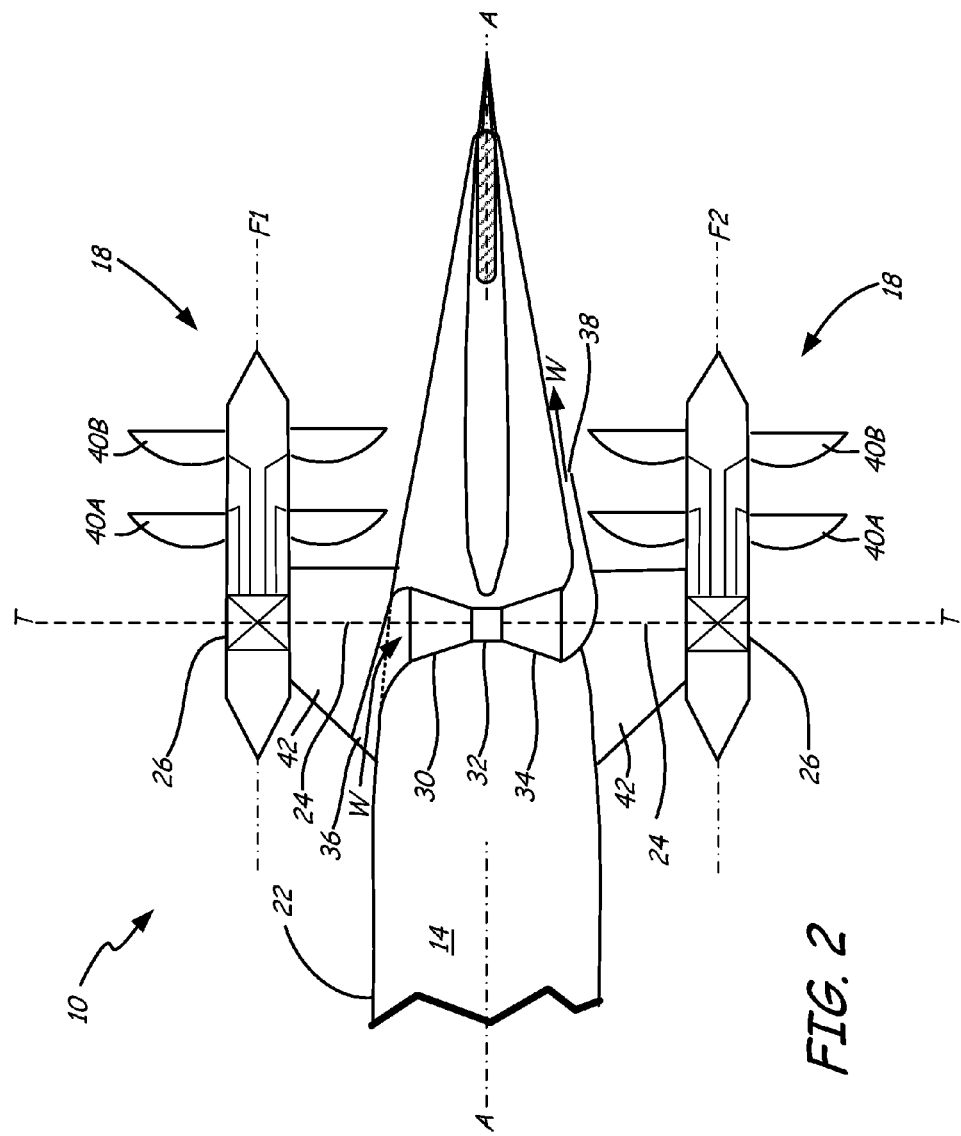
FIG. 2 is a schematic top view of the aircraft, showing the tail section with twin propulsion fans.

FIG. 2 is a schematic top view of aircraft 10, showing tail section 22 of fuselage 14 with twin propulsion fans 18. Propulsion fans 18 rotate about fan axes F1 and F2, transverse to turbine axis T and longitudinal with respect to fuselage axis A.

Gas turbine engine 12 forms a power core including compressor section (or compressor) 30, combustor section (burner or combustor) 32 and turbine section (or power turbine) 34. Compressor 30 and combustor 32 form a gas generator for the power core, where the power core includes the gas generator in flow series with power turbine 34.

Inlet 36 and exhaust nozzle 38 are located on opposite sides of fuselage 14, in tail section 22. Inlet 36 is upstream of compressor 30 in the flow series, and exhaust nozzle is 38 downstream of power turbine 34 in the flow series.

In the particular configuration of FIG. 2, twin propulsion fan assemblies 18 each include two unducted, counter-rotating fan stages (or rotors) 40A and 40B, mounted to aerodynamic struts or pylons 42 on the opposite sides of fuselage 14. Fan stages 40A and 40B counter-rotate rotate about fan axes F1 and F2 on the left (port) and right (starboard) sides of tail section 22, respectively.

In one configuration, right-angle gear boxes 26 include bevel gears to transmit power to two output gears, simultaneously driving both counter-rotating fan stages 40A and 40B, so that the load is better balanced and distributed over more gear teeth. In addition, counter-rotating fan stages 40A and 40B can be configured to reduce or eliminate swirl in the exit flow, increasing propulsive efficiency. Alternatively, propulsion fans 18 include only one fan stage 40A, without counter-rotating stage 40B.

Working fluid flow (or airflow) W enters compressor 30 via inlet 36. Compressed air is mixed with fuel in combustor 32 to generate hot combustion gas, which drives power turbine 34 and exits at exhaust nozzle 38. Gas turbine engine 12 typically has a one, two or three spool design, but the spool configuration varies with the geometry and thrust output of propulsion fans 18, and with the design of fuselage 14 and tail section (or empennage) 22.

Power turbine 34 is rotationally coupled to compressor 30 and shaft 24 about turbine axis T. Left-hand and right-hand gearboxes 26 couple left and right fan assemblies 18 to gas turbine engine 12 and power turbine 34 at opposite ends of shaft 24. Gearboxes 26 include a right-angle or transverse gearing mechanism, analogous to a STOVL (short takeoff and vertical landing) lift fan gearing, driving counter-rotating fan stages 40A and 40B with substantially parallel fan axes F1 and F2 oriented transversely or substantially perpendicular to turbine axis T, and substantially parallel or longitudinally with respect to fuselage 14.

Consistent with these definitions, "substantially parallel" include angles of up to five degrees (5°). For example, fan axes F1 and F2 may be substantially parallel within one or two degrees (1-2°), or fan axes F1 and F2 may be substantially parallel yet slightly convergent or divergent (e.g., with a cant angle of up to 5°) for improved thrust and aerodynamic or structural performance. Similarly, fan axes F1 and F2 may be substantially parallel to longitudinal axis A of fuselage 14 within 1-2°, or fan axes F1 and F2 may be substantially parallel to longitudinal axis A but angled by up to 5° in order to improve airflow, efficiency, thrust output and operational stability over a range of different angles of attack.

Similarly, "substantially perpendicular" includes angles of eighty to ninety degrees (80-90°). Thus, turbine axis T may be oriented transversely and substantially perpendicular to longitudinal axis A, but with an upstream or downstream angle of up to 10° to improve airflow. Alternatively, a "transverse" orientation includes angles of sixty to ninety degrees (60-90°); that is, with turbine axis T oriented at an upstream or downstream angle of up to 30° with respect to longitudinal axis A. Conversely, a "longitudinal" orientation for propulsion fans 18 includes angles of up to thirty degrees (0-30°) between fan axes F1, F2 and longitudinal axis A of fuselage 14.

FIGS. 1 and 2 illustrate a single-core gas generator and power turbine design, with gas turbine engine 12 mounted transversely in the aft fuselage (tail section 22) of aircraft 10. Power shaft (or output shaft) 24 connects gas turbine engine 12 to two separate propulsors (or fan assemblies) 18, mounted on opposite sides of fuselage 14 with power transmission by means of right angle gearboxes 26.

In some designs, fan assemblies 18 have a two-stage, counter-rotating, unducted or open rotor propfan configuration. Inlet 36 is arranged on one side of fuselage 14 (e.g., on the right side of aircraft 10, as shown in FIG. 2, or on the left, or on an upper or lower section of fuselage 14). Power turbine exhaust nozzle (or outlet) 38 is arranged opposite inlet 36, either on the left or right side of aircraft 10, or on a lower or upper portion of fuselage 14.

As opposed to existing high-bypass turbofan designs, the single power core design of gas turbine engine 12 forms a relatively small gas generator and power turbine combination, with less weight and greater fuel efficiency. Compressor 30, combustor 32 and turbine 34 also have at a much smaller diameter than propulsion fans 18, and can be configured for transverse mounting in a relatively small tail section 22.

Thus, the single-core, two-propulsor configuration of gas turbine engine 12 and propulsion fans 18 provides a light, efficient, and low-drag propulsion engine for use on aircraft 10. Applications include unmanned aerial vehicles (UAVs), drones and transports.

This single-core design is also applicable to manned military transports and drone aircraft (UAVs) over a range of size classes where the use of a single power core is appropriate, as opposed to larger-scale commercial aircraft, where two or more engines may be mandated. The design provides substantial savings in weight and cost, while retaining the thrust benefits of a twin propulsion fan.

Propeller engines are typically larger in diameter than turbofans and geared turbofan (GTF) engines, and counter-rotating (CR) engines are smaller in diameter than single-rotation configurations. That is, counter-rotating engines run to higher disk power loading, for the same thrust. Twin-propulsion engines are also smaller in diameter than a single-rotor configuration, with equivalent total thrust. As a result, twin counter-rotating propulsion fans are significantly smaller in diameter than single single-rotation pusher engines, providing greater design flexibility for overall aircraft configuration.

In addition, core flow W is decoupled from the flow through propulsion fans 18. This allows inlet 36 and outlet 38 to be sized and configured for the relatively lower core flow volume, as opposed to the higher inlet flow of a standard turbofan design. The transverse mount of gas turbine engine 12 also avoids issues related to both tractor-type (forward mount) engine configurations, where the core inlet flow passes through the propeller or fan blades, and pusher-type (aft mount) configurations, where interference between the exhaust flow and fan or propeller rotation is an issue.

Figure 3:
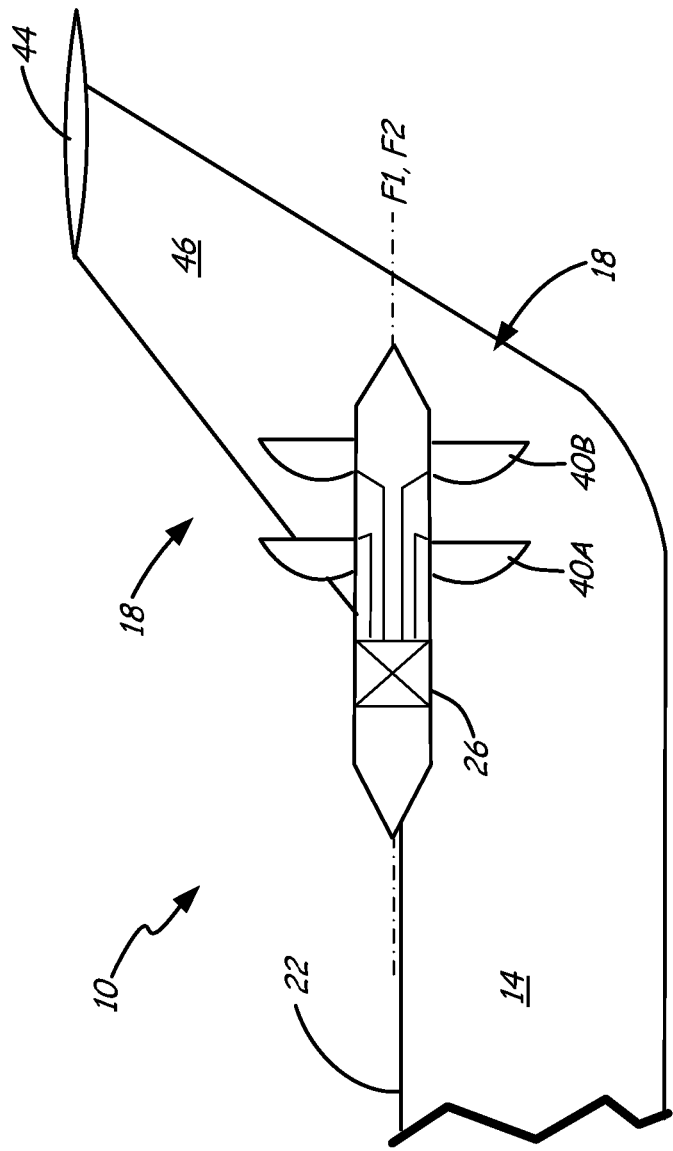
FIG. 3 is a schematic side view of the aircraft, showing the T-tail configuration of the tail section.

FIG. 3 is a side view of aircraft 10 with transverse mounted gas turbine engine 12, showing the T-tail configuration of fuselage 14 in tail section 22. In this configuration, horizontal stabilizer (or tailplane) 44 is mounted to the top portion of vertical stabilizer 46, above twin fan assemblies 18. This places horizontal stabilizer 44 well out of the fan wake, and well out of the downstream airflow from the wing, for improved airflow and control.

Figure 4:
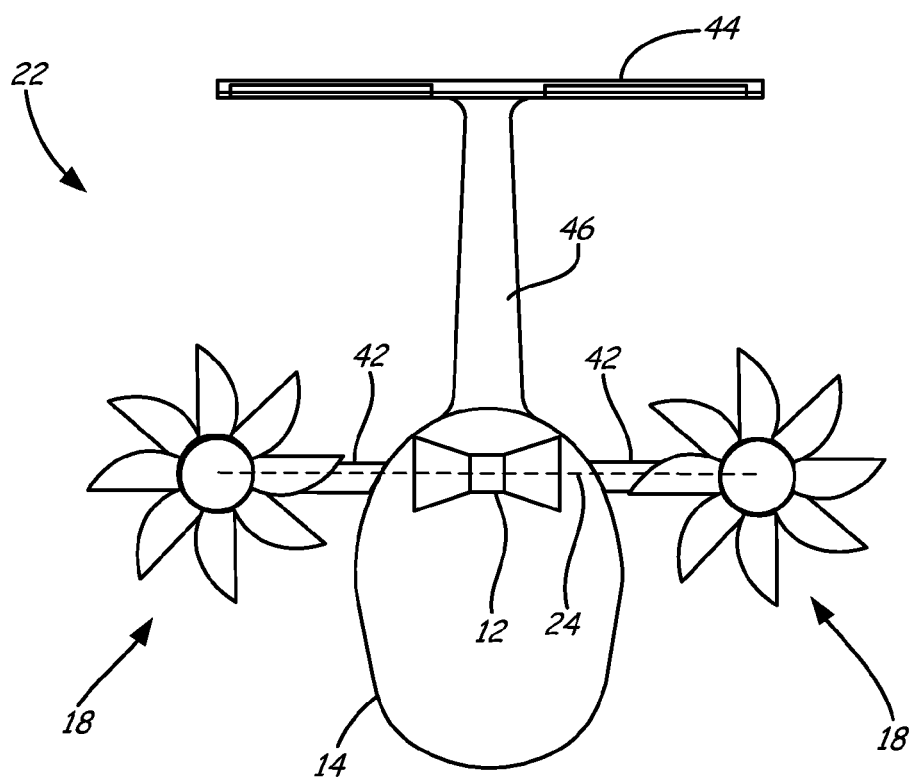
FIG. 4 is a schematic axial view of the tail section.

FIG. 4 is a schematic axial view of tail section 22. Tail section 22 includes horizontal stabilizer 44 mounted to the top of vertical stabilizer 46, with twin propulsion fans 18 located on opposite sides of fuselage 14, mounted to left and right struts or pylons 42, respectively. Single-core gas turbine engine 12 is transversely mounted in fuselage 14, and rotationally coupled to propulsion fans 18 via right-angle gearing on the opposite ends of power shaft 24, as described above.

While this invention has been described with reference to exemplary embodiments, it will be understood by those skilled in the art that various changes may be made and equivalents may be substituted for elements thereof without departing from the spirit and scope of the invention. In addition, modifications may be made to adapt a particular situation or material to the teachings of the invention, without departing from the essential scope thereof. Therefore, the invention is not limited to the particular embodiments disclosed herein, but includes all embodiments falling within the scope of the appended claims.

The invention claimed is:
1. A propulsion engine of an aircraft comprising:
  a compressor, a combustor and a turbine mounted in flow series about a turbine axis;

a shaft coupled to the turbine along the turbine axis; and first and second propulsion fans rotationally coupled to the turbine at opposite ends of the shaft;

wherein the first and second propulsion fans rotate about axes that are substantially parallel to one another, and wherein the axes of the first and second propulsion fans are also transverse with respect to the turbine axis;

wherein the propulsion engine is mounted transversely in a fuselage of the aircraft.

2. The propulsion engine of claim 1, further comprising first and second right angle gears coupling the first and second propulsion fans to the opposite ends of the shaft.

3. The propulsion engine of claim 2, wherein the first and second propulsion fans rotate substantially perpendicularly to the turbine axis.

4. The propulsion engine of claim 1, wherein each of the first and second propulsion fans comprises an open rotor.

5. The propulsion engine of claim 4, wherein each of the first and second propulsion fans comprises two counter-rotating fan stages.

6. A gas turbine engine of an aircraft having a fuselage comprising:

a single power core comprising a compressor, a combustor and a power turbine rotationally coupled about a turbine axis;

two propulsion fans transversely coupled to the single power core via a power shaft, wherein the power shaft is oriented along the turbine axis; and gearboxes rotationally coupling the two propulsion fans to the power shaft; wherein the two propulsion fans each rotate about axes that are transverse to the turbine axis;

wherein the single power core is mounted transversely to the fuselage and the two propulsion fans rotate longitudinally with respect to the fuselage.

7. The gas turbine engine of claim 6, wherein the gearboxes comprise right angle gear mechanisms coupling the two propulsion fans to opposite ends of the shaft.

8. The gas turbine engine of claim 7, wherein each of the two propulsion fans rotates substantially perpendicularly to the turbine axis.

9. The gas turbine engine of claim 6, wherein each of the two propulsion fans comprises an unducted fan rotor.

10. The gas turbine engine of claim 6, wherein each of the two propulsion fans comprises two counter-rotating fan stages.

11. An unmanned aerial vehicle comprising the gas turbine engine of claim 6.

12. An aircraft comprising:

a fuselage having a nose section and a tail section separated along a longitudinal axis;

a wing mounted to the fuselage between the nose section and the tail section;

a compressor, a combustor and a turbine mounted in the fuselage, the compressor and turbine rotationally coupled about a turbine axis that is transverse to the longitudinal axis of the fuselage; and twin fan assemblies mounted on opposites sides of the fuselage, each of the twin fan assemblies comprising a propulsion fan rotational coupled to the turbine;

wherein each of the twin fan assemblies rotates about an axis that is transverse with respect to the turbine axis and longitudinal with respect to the fuselage axis.

13. The aircraft of claim 12, wherein the gas turbine engine is mounted in the tail section of the fuselage.

14. The aircraft of claim 13, further comprising an inlet and an outlet in flow series with the compressor, the combustor and the turbine, the inlet and the outlet located on the opposite sides of the tail section.

15. The aircraft of claim 13, further comprising a vertical stabilizer mounted to the tail section and a horizontal stabilizer section mounted to a top of the vertical stabilizer, above the twin fan assemblies.

16. The aircraft of claim 12, wherein each of the twin fan assemblies rotates about an axis that is substantially perpendicular to the turbine axis and substantially parallel to the fuselage axis.

17. The aircraft of claim 12, wherein each of the twin fan assemblies comprises two open-rotor, counter-rotating fan stages.

18. The aircraft of claim 12, wherein the aircraft is configured as an unmanned drone.

* * * * *